(12) United States Patent
Hanna et al.

(10) Patent No.: US 11,576,395 B2
(45) Date of Patent: Feb. 14, 2023

(54) SYSTEMS AND METHODS FOR MAKING AND APPLYING STRIPS OF EDIBLE MATERIAL

(71) Applicant: MARS, INCORPORATED, McLean, VA (US)

(72) Inventors: Alex A. Hanna, Cleveland, TN (US); Stuart Alan Guinn, Cleveland, TN (US); Rodger Dale Ellis, Cleveland, TN (US); Joe Mark Posey, Cleveland, TN (US)

(73) Assignee: MARS, INCORPORATED, McLean, VA (US)

( * ) Notice: Subject to any disclaimer, the term of this patent is extended or adjusted under 35 U.S.C. 154(b) by 400 days.

(21) Appl. No.: 14/649,443

(22) PCT Filed: Dec. 30, 2013

(86) PCT No.: PCT/US2013/078317
§ 371 (c)(1),
(2) Date: Jun. 3, 2015

(87) PCT Pub. No.: WO2014/106184
PCT Pub. Date: Jul. 3, 2014

(65) Prior Publication Data
US 2015/0320074 A1    Nov. 12, 2015

Related U.S. Application Data
(60) Provisional application No. 61/747,546, filed on Dec. 31, 2012.

(51) Int. Cl.
*A23G 3/34* (2006.01)
*A23G 3/02* (2006.01)
(Continued)

(52) U.S. Cl.
CPC ........... *A23G 3/0019* (2013.01); *A21D 13/24* (2017.01); *A23G 3/0236* (2013.01);
(Continued)

(58) Field of Classification Search
CPC ................ A23G 3/0019; A23G 3/0236; A23G 3/0252; A23G 3/34; A23G 3/50; A23G 3/54
See application file for complete search history.

(56) References Cited

U.S. PATENT DOCUMENTS 2,612,851 A * 10/1952 Morrison ............. A23G 3/0242
                                                 165/89
4,454,834 A    6/1984 Haas, Sr. et al.
4,473,344 A * 9/1984 Sollich ................... A23G 9/286
                                                 118/414
(Continued)

FOREIGN PATENT DOCUMENTS

EP    1203533 B1 *  5/2006  ............. A21C 3/027
GB    2023483        1/1980
(Continued)

OTHER PUBLICATIONS

English Translation of EP1203533B1 (Year: 2002).*
Buhler, "Retrofit: Licking roller device for cleaning of chocolate moulds", Brochure, www.bindler.com, Undated, 2 pp.

*Primary Examiner* — Stephanie A Cox

(57) ABSTRACT

A system and method are provided for making strips of edible material. Edible material is contained in a hopper having a discharge opening including a first side and a second side. A discharge shaping roller is positioned so that its surface is adjacent to the first side and said second side. Similarly, a cooling roller is also positioned so that its surface is adjacent to the first side and the second side. Edible material passes between the first side, the second side, the cooling roller, and the discharge roller to from a (Continued)

strip of edible material that is deposited on the cooling roller. The cooling roller then cools the strip of edible material and it is separated from the cooling roller by a blade. Once the strip is separated from the cooling roller it is deposited on a base of edible material such as a cookie or wafer.

19 Claims, 8 Drawing Sheets

(51) Int. Cl.
  *A23G 3/50* (2006.01)
  *A23G 3/54* (2006.01)
  *A23P 30/00* (2016.01)
  *A21D 13/24* (2017.01)
  *A21C 15/00* (2006.01)
(52) U.S. Cl.
  CPC .............. *A23G 3/0252* (2013.01); *A23G 3/34* (2013.01); *A23G 3/50* (2013.01); *A23G 3/54* (2013.01); *A23P 30/00* (2016.08); *A21C 15/002* (2013.01); *A23V 2002/00* (2013.01)

(56) References Cited

U.S. PATENT DOCUMENTS

| | | | |
|---|---|---|---|
| 4,518,617 A | 6/1985 | Haas, Sr. et al. | |
| 5,870,947 A | 2/1999 | Harada | |
| 6,419,969 B2 | 7/2002 | Lefebvre | |
| 7,891,312 B2 * | 2/2011 | Clarke | A21D 8/00 118/13 |
| 2001/0028905 A1 * | 10/2001 | Lefebvre | A21C 9/04 426/103 |
| 2003/0072853 A1 * | 4/2003 | Murray | A23G 3/0236 426/132 |
| 2004/0161511 A1 * | 8/2004 | Peterson | A23G 1/0016 426/392 |

FOREIGN PATENT DOCUMENTS

| | | | | |
|---|---|---|---|---|
| GB | 2023483 A * | 1/1980 | | A23G 3/0236 |
| GB | 1561692 | 2/1980 | | |
| GB | 2105165 | 3/1983 | | |
| SU | 1752173 | 7/1992 | | |
| WO | 03005832 | 1/2003 | | |

* cited by examiner

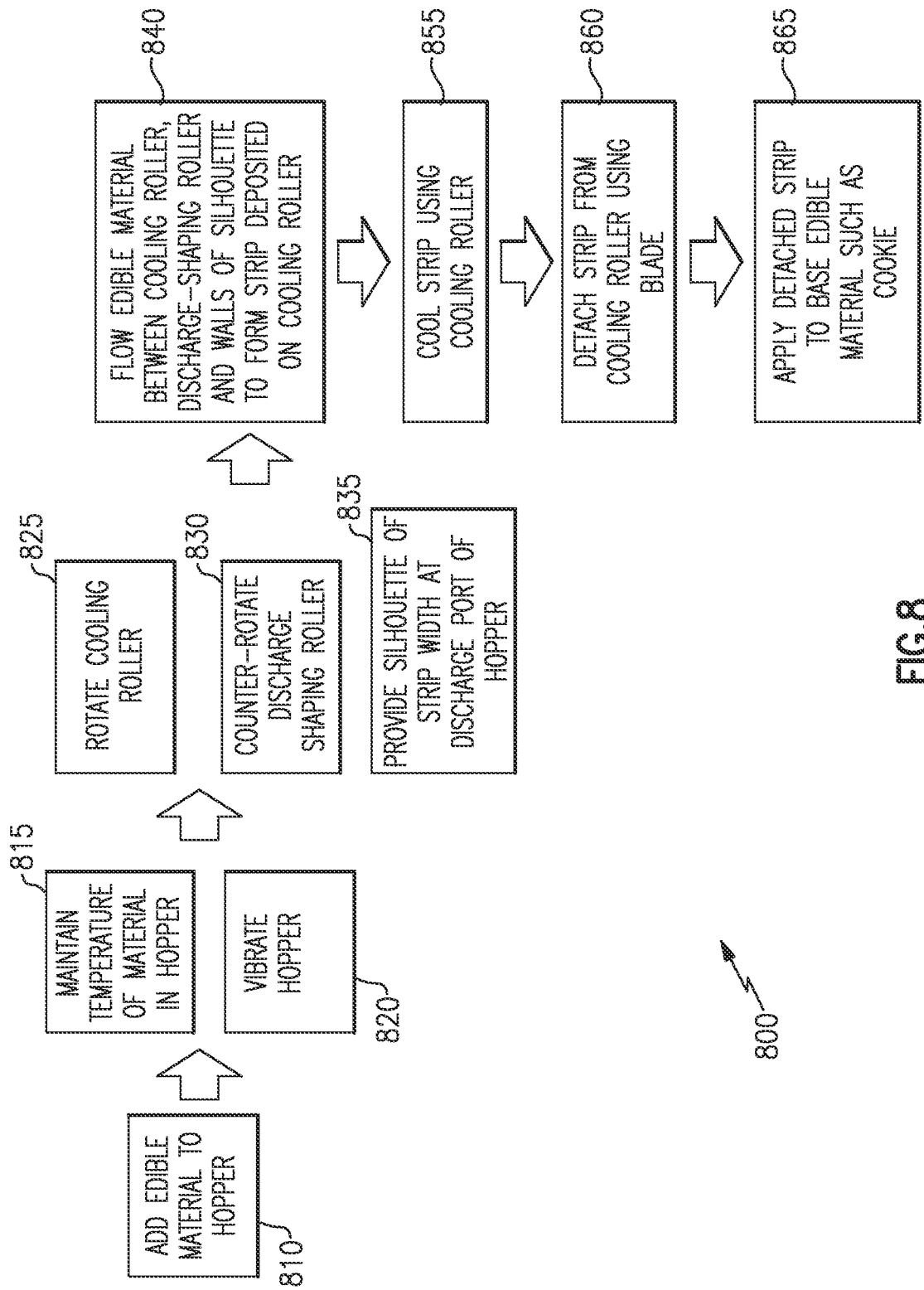

SYSTEMS AND METHODS FOR MAKING AND APPLYING STRIPS OF EDIBLE MATERIAL

BACKGROUND OF THE INVENTION

The present invention generally relates to making strips of edible material. More particularly, the present invention relates to making strips of edible material and applying the strips to a base of edible material such as a cookie or wafer.

Current systems and methods for making strips of edible material may have certain drawbacks or may not be usable depending on the specific edible material desired to be processed.

For example, in a prior art system, a strip of an edible material such as confectionary may be made and then applied to a base of another type of edible material, such as cookie or wafer, for example, to form a confectionary product. In this context, current strip-making devices may suffer from one or more of the following drawbacks: they may allow skipping (missed areas). They may supply too much of the edible material in the strip which may lead to waste and/or overuse. They may be labor intensive, for example, when the edible material comprising the strip is a solution, solids may fall out of the solution and may cause blockages and/or component wear. Further, the devices may be recipe and/or line rate dependent, which may undesirably dictate how the production line must be run.

Some prior art strip applicators may be simple devices, but may have drawbacks because of their simplicity. For example, the strip applicator may be composed of an open hopper on a drum with a slotted gate to define strip geometry and allow a strip to be pulled out of the hopper. Such a system may be usable with certain types of edible material. However, for certain other types of edible material used to form the strips, the prior art system may not be viable.

BRIEF SUMMARY OF THE INVENTION

One or more of the embodiments of the present invention provide a system and method for making one or more strips of an edible material. Flowable edible material in a hopper passes through a discharge opening having a first side and a second side. Adjacent to the first side and the second side is positioned the surface of a discharge shaping roller. Additionally, the surface of a cooling roller is also positioned adjacent to the first and second sides. Flowable edible material is formed into a strip by passing between the first and second sides, the surface of the discharge roller and the surface of the cooling roller. The strip of edible material is deposited on the surface of the cooling roller where is it cooled and eventually separated from the cooling roller by a blade. Once the strip of edible material is separated from the cooling roller, it is deposited on a base of edible material such as a cookie or wafer, for example.

BRIEF DESCRIPTION OF THE DRAWINGS

FIG. 8 illustrates a flow chart of an embodiment of a method for making and applying a strip of edible material such as barrier crème, for example, to a base edible material, such as cookie or wafer, for example.

DETAILED DESCRIPTION OF THE INVENTION

Figure 1:
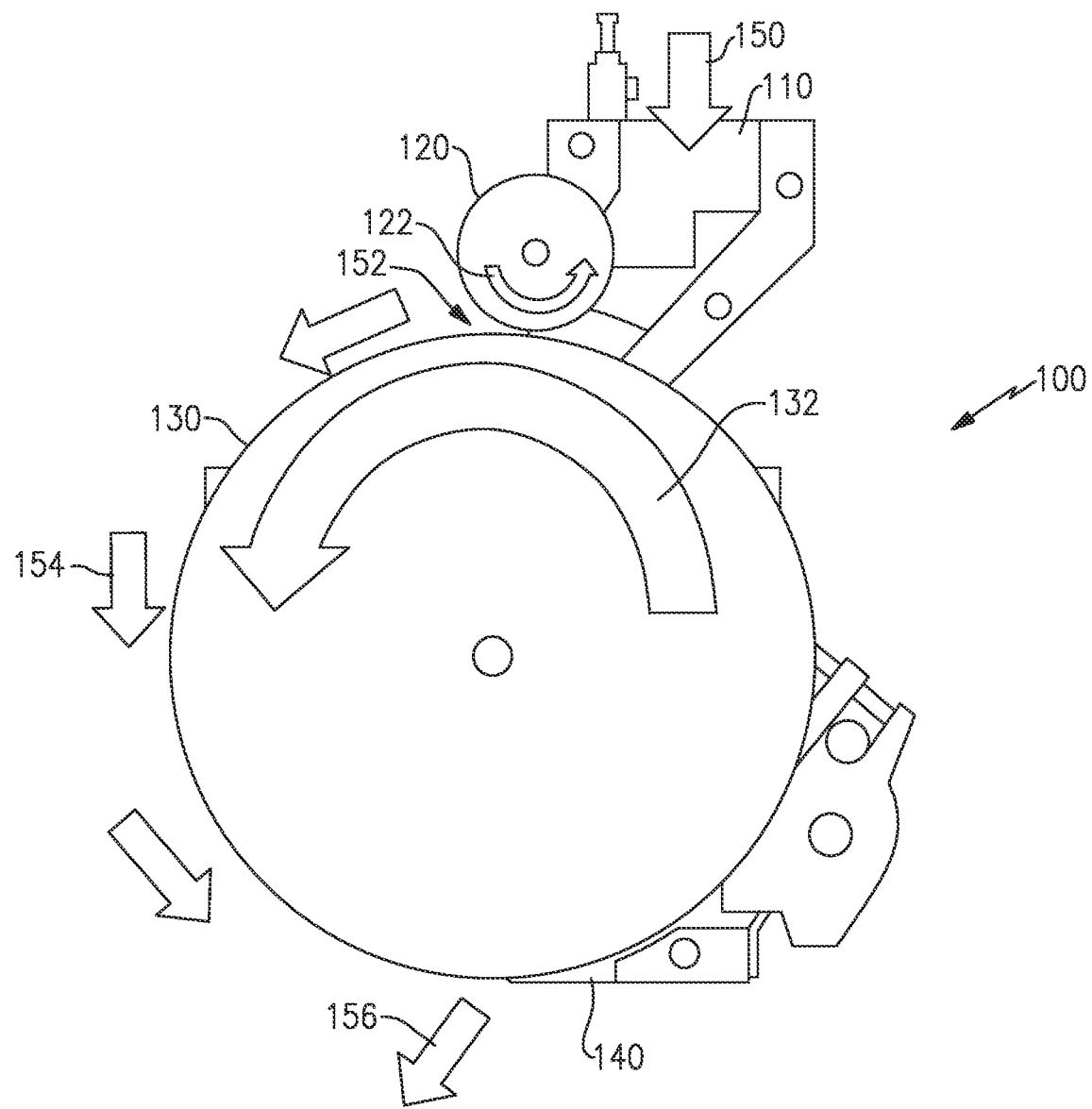
FIG. 1 illustrates a system for making a strip of edible material according to an embodiment of the present invention.

FIG. 1 illustrates a system for making a strip of edible material 100 according to an embodiment of the present invention. The system for making a strip of edible material 100 includes hopper 110, a discharge shaping roller 120, a discharge shaping roller direction of rotation 122, a cooling roller 130, a cooling roller direction of rotation 132, a blade 140, edible material 150, a strip sizing region 152, a strip cooling region 154, and a strip separation region 156.

In operation, edible material 150 is added to the hopper. The edible material is preferably a suspension such as barrier crème. The edible material 150 is preferably added to the hopper in a liquefied form and/or heated in the hopper in order to become liquefied. Alternatively, the edible material may be described as one or more of viscous, flexible, plastic, flowable, and deformable. In some embodiments, the edible material is a fat based suspension wherein the fat content is at least 50% w/w by weight of the edible material. In such fat based suspensions, there is a tendency for the non-fat solids to separate out of the suspension particularly when the edible material is heated above the melting point of the fat.

The base of the hopper is divided into several strip-forming regions as further described below. Each strip forming region includes a discharge opening having a left wall and/or side and a right wall and/or side. The walls extend from the bottom of the hopper and end adjacent to and/or in contact with the discharge shaping roller 120.

Liquefied edible material passes between the discharge opening of the hopper 110 and the discharge shaping roller 120 and is deposited on the cooling roller 130. The edible material that is deposited on the cooling roller 130 adheres to the cooling roller and is rotated in the direction of the cooling roller direction of rotation 132. As the edible material is rotated by the cooling roller 130, it is in contact with the discharge shaping roller 120, which is rotating in the discharge shaping roller direction of rotation 122.

The cooling roller 130 and the discharge shaping roller 120 are positioned with a distance between them of substantially the height of a desired strip of edible material. At the strip sizing region 152, the counter rotation of the cooling roller and discharge shaping roller 120 operates to limit the height of the strip of edible material by one or more of squeezing, forming, grinding, and/or otherwise removing edible material. In one embodiment, the discharge shaping roller 120 is a licking-style roller.

The cooling roller 130 is preferably cooled and/or chilled. Consequently, as the edible material continues to remain in contact with the cooling roller as the cooling roller rotates, the strip of edible material is in a strip cooling region 154 where heat is removed from the edible material. Additionally, as heat is removed from the edible material, the edible material preferable plasticizes and/or becomes more viscous, and/or becomes less flowable, less deformable, and/or less liquid.

Finally, at the strip separation region 156, the strip of edible material that is adhered to the cooling roller 130 encounters the blade 140 and is scraped off of the cooling roller 130. As further described below, once the edible material is scraped off of the cooling roller 130, it may be deposited on another edible material such as a cookie or wafer, for example.

Figure 2:
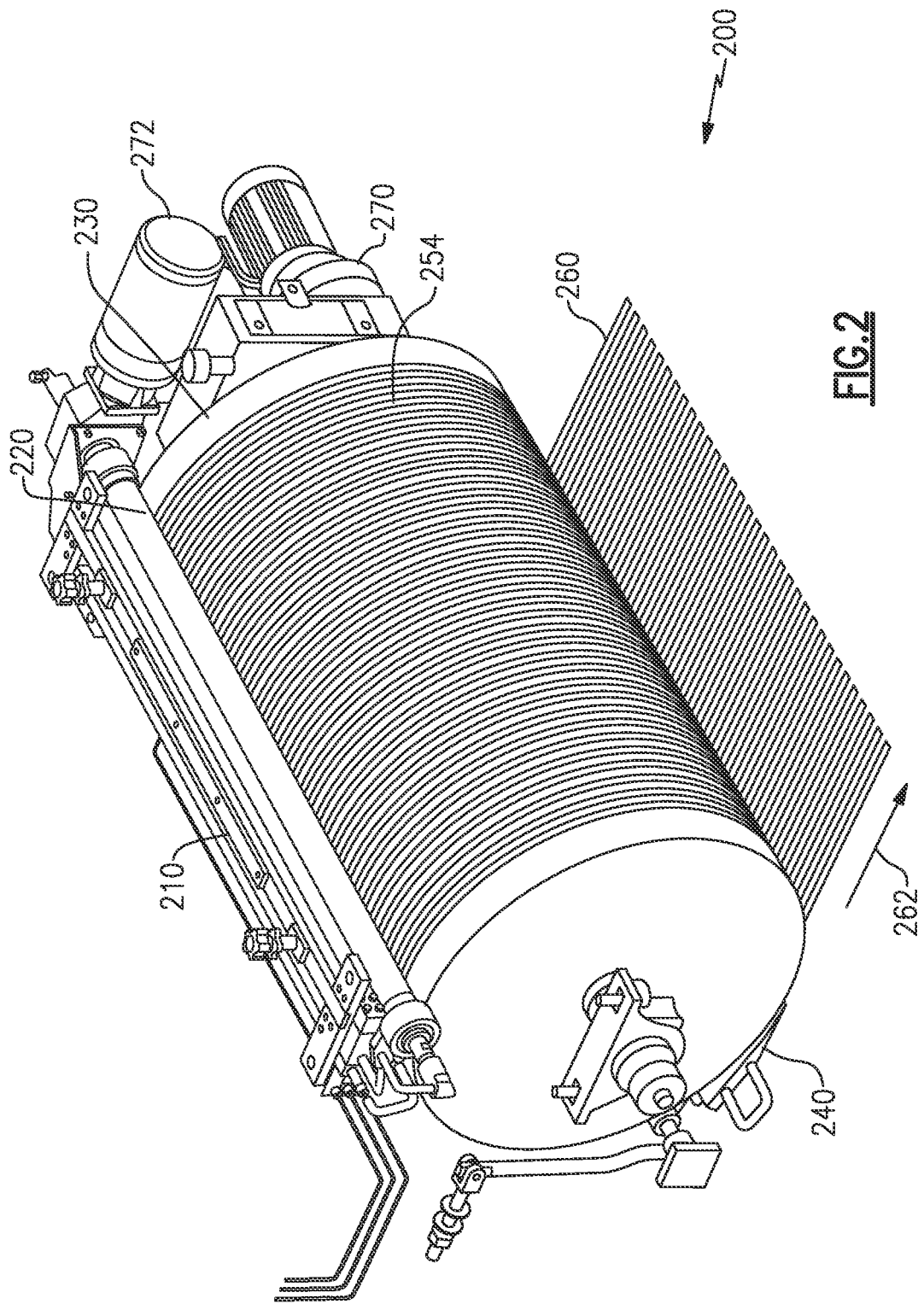
FIG. 2 illustrates a more detailed rendition of the system for making a strip of edible material of FIG. 1.

FIG. 2 illustrates a more detailed rendition 200 of the system for making a strip of edible material of FIG. 1. The more detailed rendition 200 includes a hopper 210, a discharge shaping roller 220, a cooling roller 230, a blade 240, strips of edible material on the cooling roller 254, strips of edible material that have been separated from the cooling roller 260, a direction of post-cooling roller strip travel 262, a cooling roller motor 270, and a discharge shaping roller motor 272.

In operation, as described above, edible material is introduced into the hopper 210 and liquefied edible material is deposited on the cooling roller 230 and passes between the rotating discharge shaping roller 220 and the cooling roller 230. The discharge shaping roller 220 is rotated by the discharge shaping roller motor 272. The cooling roller 230 is rotated by the cooling rotor motor 270.

As described above, the strips of edible material on the cooling roller 254 continue to revolve on the cooling roller 230 until they contact the blade 240 which mechanically induces them away from the cooling roller 230. Alternatively, the blade 240 may scrape, cut, shave, or angle the edible material away from the cooling roller 230.

Once the strips of edible material have been removed from the cooling roller, they form strips of edible material that have been separated from the cooling roller 260. The strips of edible material that have been separated from the cooling roller 260 are preferably allowed to come into mechanical contact with another edible substance that forms a base, such as cookie or wafer, for example, in order to provide a coating for the other base edible substance and/or material. The other base edible material is preferably mechanically induced to move in the direction indicated by the direction of post-cooling roller strip travel 262, for example, by being placed on a conveyor belt. Because the strips of edible material are now in mechanical contact and possibly adhered to said base edible material, the combination of the strip and the base edible material continues to travel in the direction of the post-cooling roller strip travel 262.

One or both of the cooling roller motor 270 and the discharge shaping roller motor 272 may be an AC motor or a DC motor. Additionally, one or more of the motors may include an inverter. Also, the combination of the cooling roller and the cooling roller motor may be known as the cooling roller assembly or the chilled roll assembly.

Figure 3:
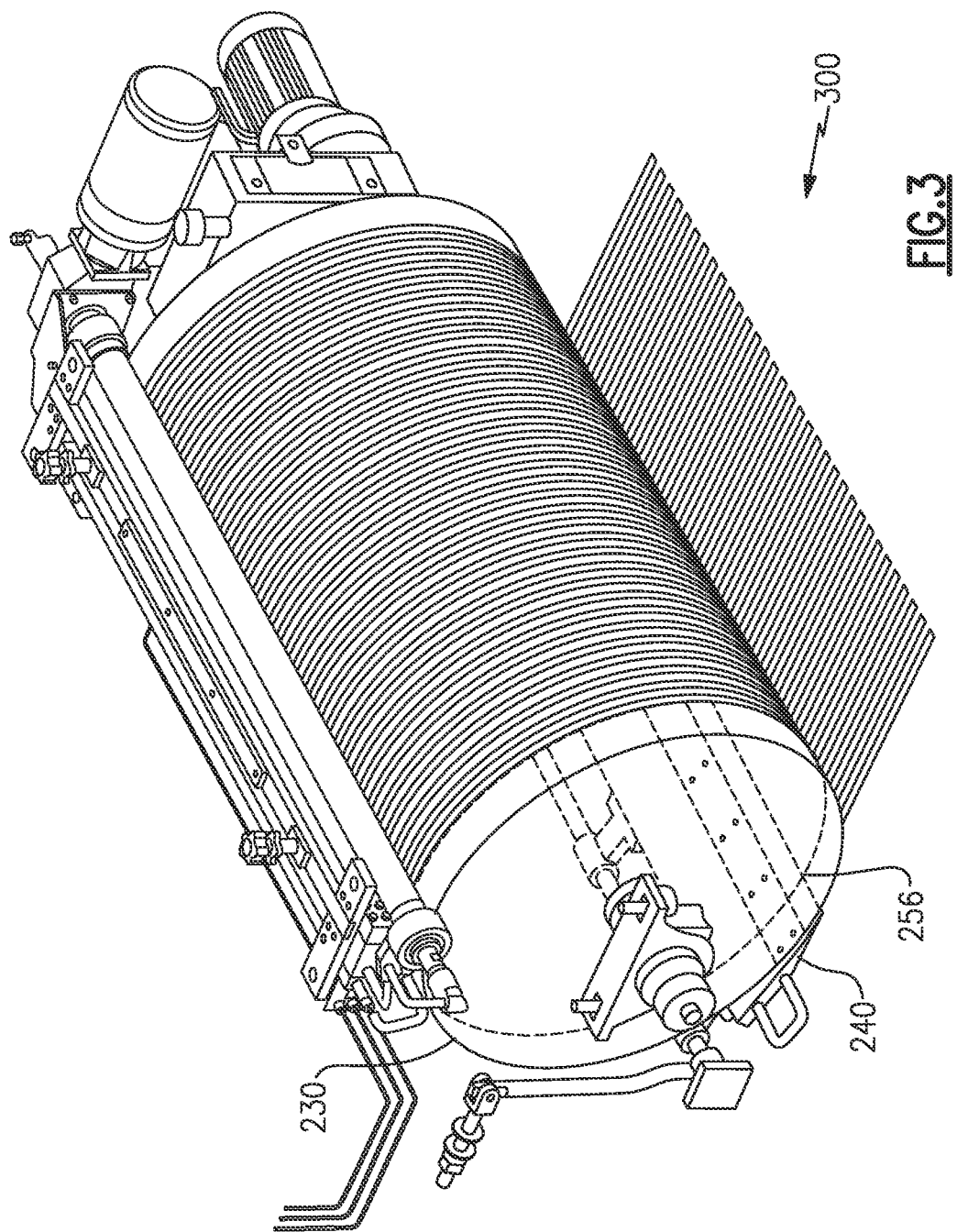
FIG. 3 is a transparent view of the cooling roller that allows the positioning of the blade relative to the cooling roller to be seen.

FIG. 3 is a transparent view 300 of the cooling roller 230 that allows the positioning of the blade 240 relative to the cooling roller 230 to be seen. Additionally, the strip separation region 256 may also be seen. The blade 240 may also be known as a doctor blade or a doctor blade assembly.

Figure 4:
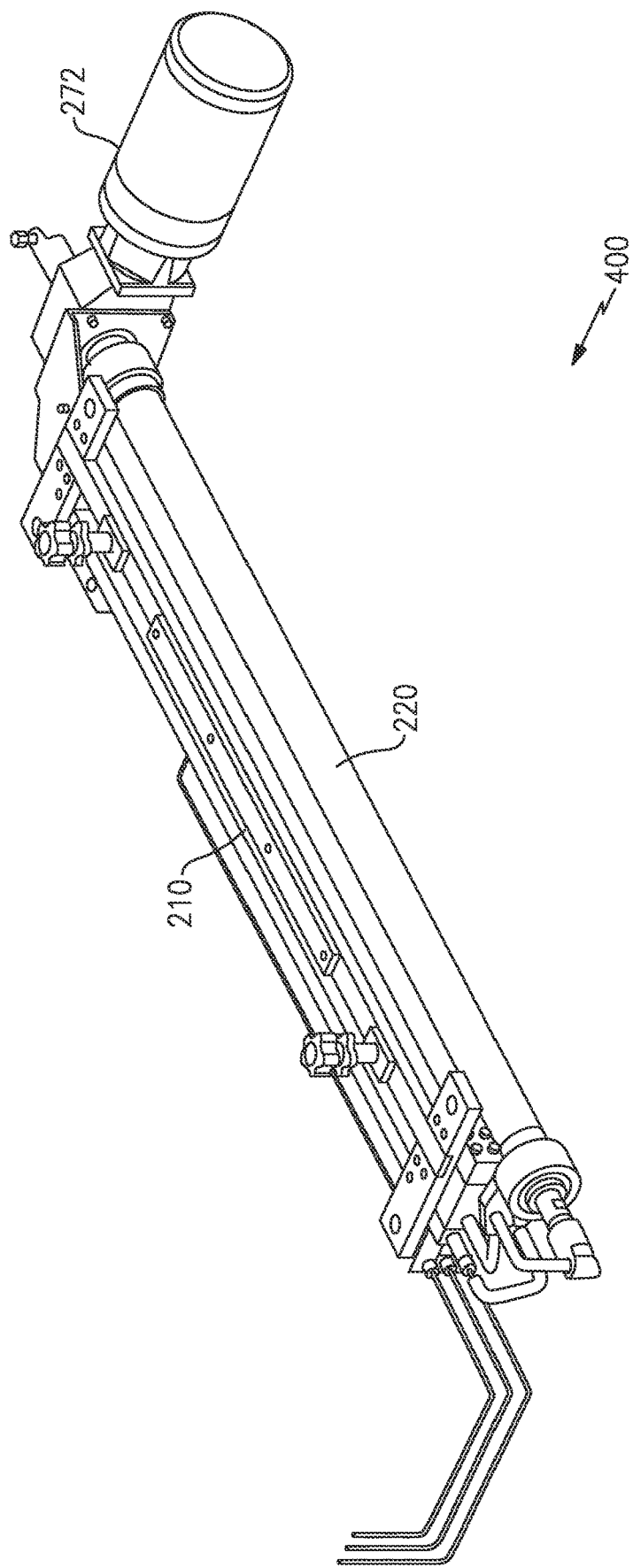
FIG. 4 illustrates a close-up view of the hopper, the discharge shaping roller and the discharge shaping roller motor.

FIG. 4 illustrates a close-up view 400 of the hopper 210, the discharge shaping roller 220 and the discharge shaping roller motor 272. The structures shown in FIG. 4 may also be known as the hopper assembly.

Figure 5:
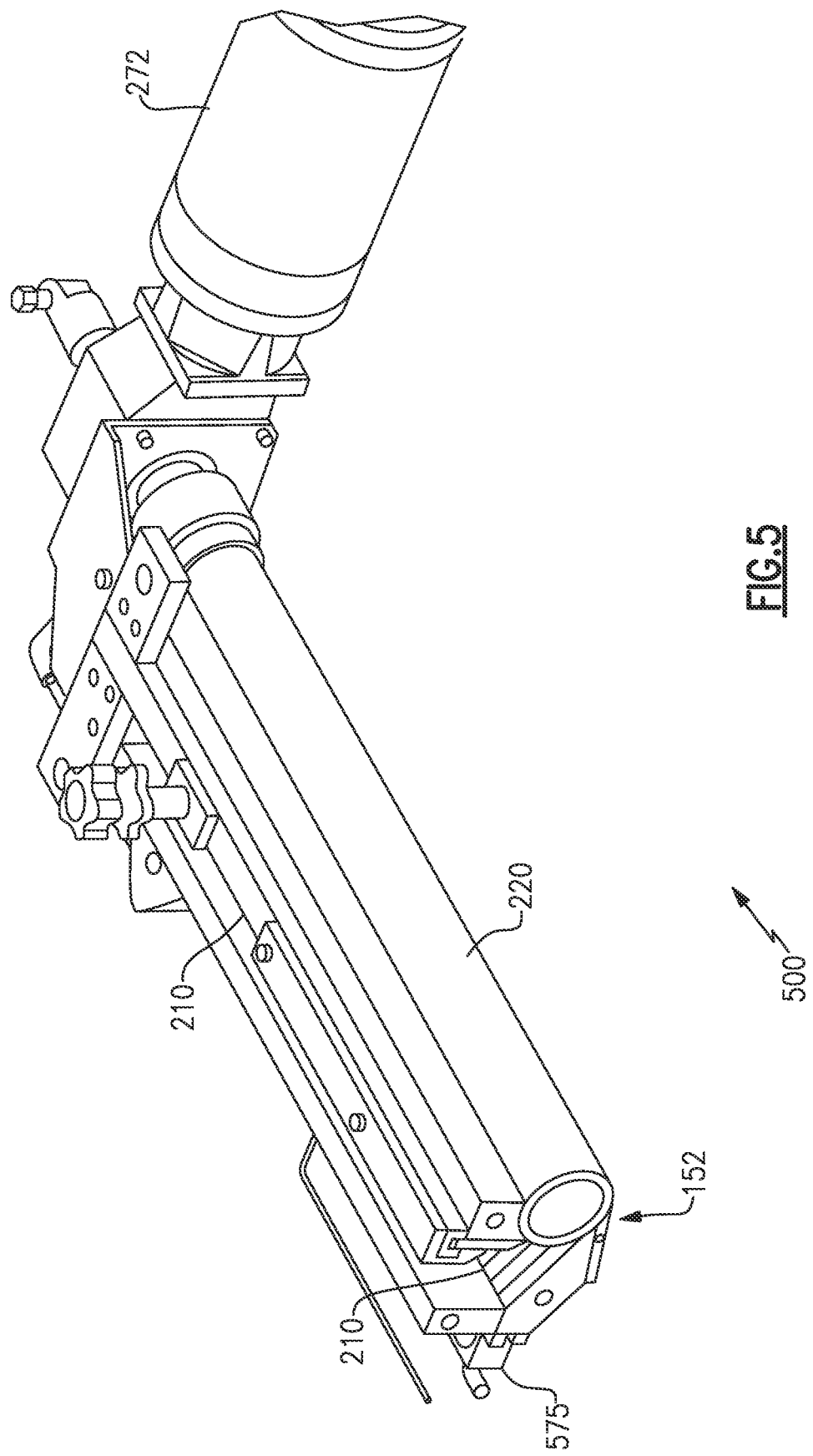
FIG. 5 illustrates a cut-away view of the hopper assembly of FIG. 4.

FIG. 5 illustrates a cut-away view 500 of the hopper assembly of FIG. 4. The cut-away view 500 includes the hopper 210, the discharge shaping roller 220, the discharge shaping roller motor 272, the strip sizing region 152, and a hopper vibrator 575. The operation of the hopper assembly of FIG. 5 generally proceeds as described above with the addition of the hopper vibrator 575. The hopper vibrator 575 vibrates the hopper 210 during operation and may provide one or more beneficial effects such as reducing jamming of the hopper, allowing heat to more evenly spread through the edible material in the hopper, and/or allowing edible material to pass through the strip sizing region more easily.

Additionally, the hopper is preferably heated so as to either cause the edible material to liquefy and/or to maintain the edible material in a liquid state.

Additionally, the strip sizing region may be called a silhouette and may include several discharge openings through which edible material may pass.

Also, the discharge shaping roller 220 may be heated. Additionally, the discharge shaping roller may be a licking-style roller.

Figure 6:
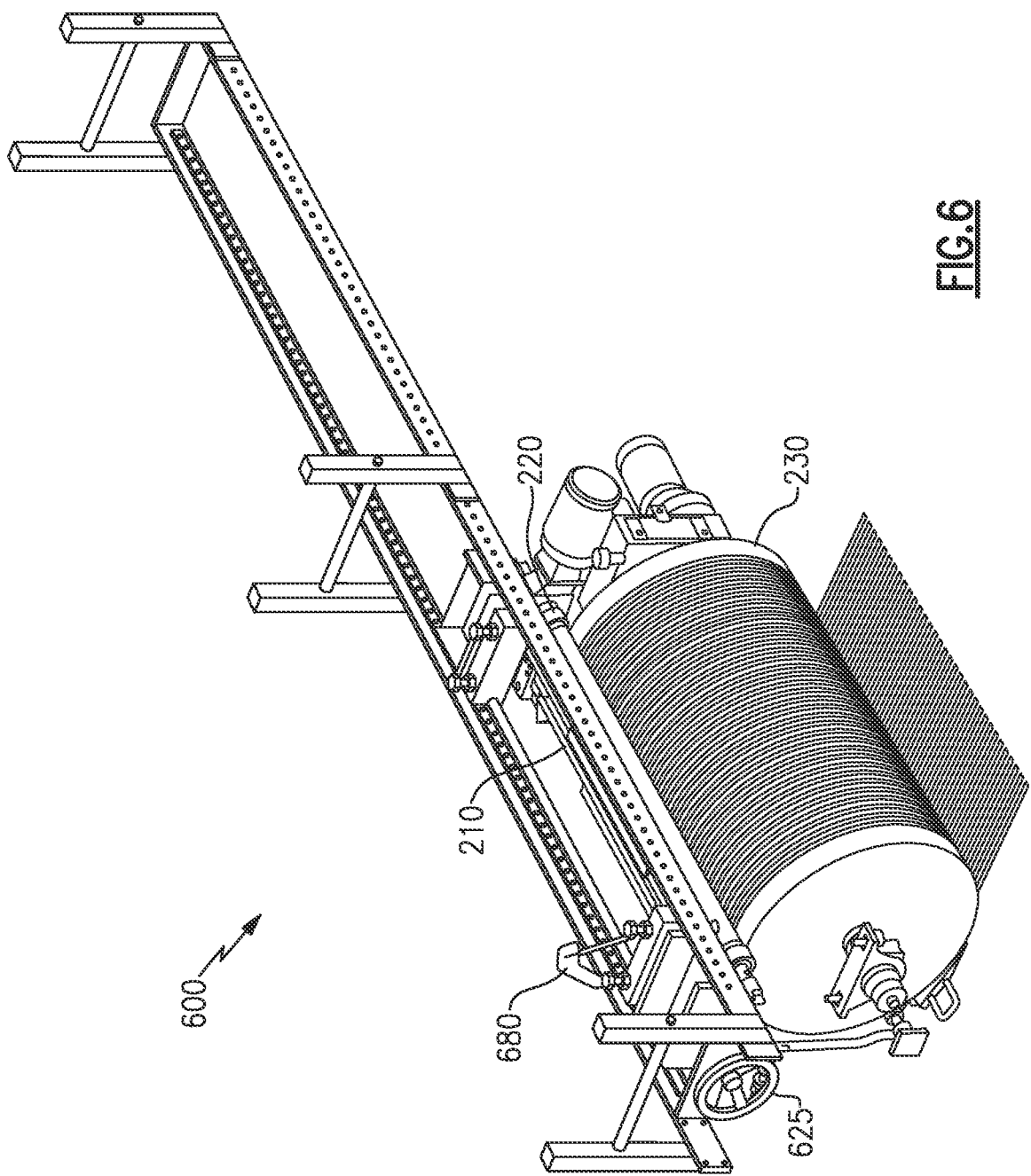
FIG. 6 illustrates an embodiment of the system for making strips of edible material where the hopper assembly is laterally adjustable relative to the cooling roller.

FIG. 6 illustrates an embodiment of the system for making strips of edible material where the hopper assembly is laterally adjustable relative to the cooling roller 230. More specifically, in FIG. 6, the hopper 210 and the discharge shaping roller 220 are part of a hopper assembly that also includes a hopper level sensor 680 and a hopper lateral adjustment assembly 625.

In operation, the hopper lateral adjustment assembly 625 may be used to reposition the hopper on top of the cooling roller. For example, the hopper lateral adjustment assembly 625 may be repositioned so that the strips produced are properly aligned to that they may be deposited on the strips of edible material such as cookie or wafer, for example, when they are removed from the cooling roller.

Additionally, the embodiment of FIG. 6 includes a hopper level sensor 680. The hopper level sensor 680 may be used to sense the status of the hopper and/or of the edible material inside and/or flowing through the hopper. In one example, the hopper level sensor 680 provides feedback of the level of edible material in the hopper to a pump that is responsible for pumping the edible material into the hopper. When the level of edible material reaches a predetermined high level, the pump may be controlled to reduce its rate of pumping the edible material. Additionally, when the level of edible material reaches a predetermined low level, the pump may be controlled to increase its rate of pumping edible material into the hopper. Additionally, the hopper level sensor 680 may provide an input to a warning system that may provide a warning of one or more predetermined high and/or low levels or otherwise provide an indication of status.

Figure 7:
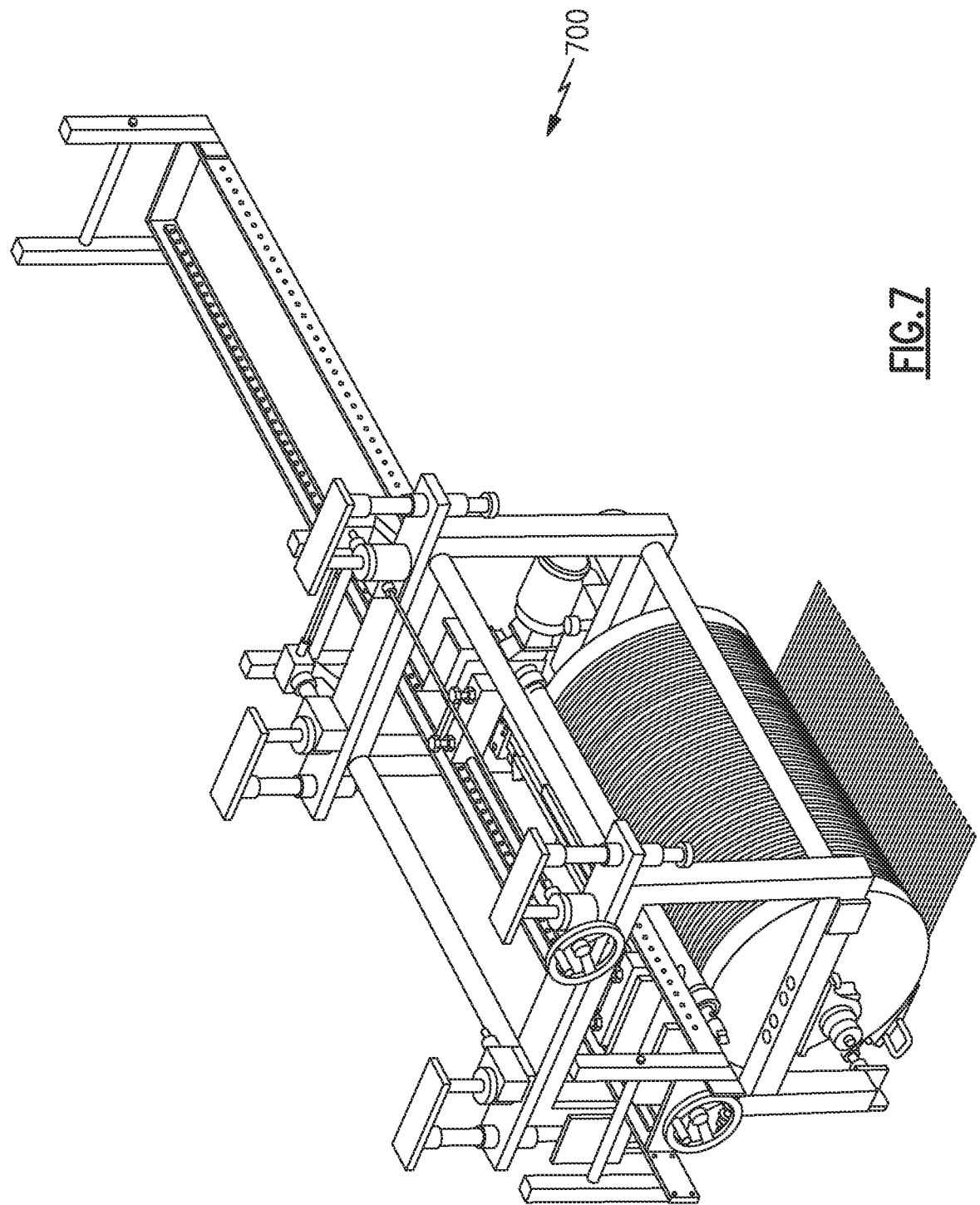
FIG. 7 illustrates a roll/frame height adjustment assembly for use with an embodiment of the present system.

FIG. 7 illustrates a roll/frame height adjustment assembly 700 for use with an embodiment of the present system. The roll/frame height adjustment assembly 700 allows the hopper assembly to be repositioned closer or farther from the base edible material such as cookie or wafer that the strips of edible material are deposited on. Additionally, the roll/frame height adjustment assembly 700 may be used for cleaning and/or hopper assembly removal or replacement.

FIG. 8 illustrates a flow chart 800 of an embodiment of a method for making an applying a strip of edible material such as barrier crème, for example, to a base edible material, such as cookie or wafer, for example. First, at step 810, edible material is added to the hopper. Next, at steps 815 and 820, the temperature of the hopper is preferably maintained so that the edible material either becomes liquefied or remains liquefied. Additionally, the hopper is preferably vibrated, for example to assist in the movement of the edible material in the hopper.

Next, at steps 825, 830, and 835, which typically take place at substantially the same time, the cooling roller is rotated and cooled, the discharge shaping roller is counter rotated and preferably heated, and the hopper includes a discharge port having a silhouette of a desired strip width, such as two walls spaced apart a desired strip width. The preferably heated and counter rotating discharge shaping roller helps maintain the integrity of an edible material comprising a fat based suspension wherein the fat content is at least 50% w/w by weight of the edible material. Without the counter rotating discharge shaping roller, the non-fat solids in such fat based suspensions can separate from the fat as the temperature nears the melting point of the fat.

Then, at step 840, the liquefied edible material is flowed between the cooling roller, discharge shaping roller, and the walls of the silhouette to form a strip and the strip is deposited on the cooling roller.

Next, at step 855, the strip is cooled by the temperature exchange with the cooling roller.

Then, at step 860, the strip is detached from the cooling roller using a blade. The blade is preferably heated.

Finally, at step 865, the detached strip is applied to a base edible material such as cookie. For example, the detached strip may fall from the cooling roller onto a cookie positioned below it. When the strip contacts the cookie, it may adhere to the cookie and form a layer of edible material on top of the cookie.

In one embodiment, the liquefied edible material is barrier crème that is deposited on a cookie to form a confectionary product. In this embodiment, heated liquid barrier crème suspension is held in the hopper. The barrier crème is fed out of the hopper onto the cooling roller, which is also known as a chilled drum or cooling drum, in strips. Once the barrier crème contacts the chilled drum and begins to cool, the strips plasticize around the drum. The blade then doctors the strips off of the cooling roller and onto warm strips of cookie that are positioned below the blade assembly, which may also be known as a scraper blade assembly.

The hopper is preferably fully heat traced in order to maintain the warmth of the barrier crème throughout. In one embodiment, minimal contact of the barrier crème to the cold drum or cool surfaces is preferably maintained. The strips of barrier crème are preferably formed through an aperture described by the cold chilled drum, the bottom of the side walls of the strip openings in the hopper and the top surface created by a counter-rotating licking-type roll.

In one embodiment, in order to assist in maintaining the temperature of the barrier crème in the hopper, both the hopper and the licking roll are heated. The openings in the hopper preferably allow only a small amount of barrier crème the width of the strip to come into contact with cool surfaces, which reduces formation of solids that may cause blockage. Also, the licking roller, preferably in constant motion, helps to keep solids in suspension and reduce barrier crème solids buildup and blockages.

In one embodiment, individual lanes are created at the lower part of the hopper. The chilled drum then pulls the barrier crème through the opening in the hopper and strips are formed using the sides of the hopper lanes, the chilled drum and the licking roll. The strips are preferably cooled on the face of the drum as it rotates and are preferably scraped off using a heated scraper blade onto a warm cookie or wafer.

Predetermined target weights for the barrier crème may be achieved through hopper/licking roll temperature, speed of licking roll, head pressure in hopper, speed of chilled drum and temperature of barrier crème being supplied. Additionally, the amount of barrier crème applied may be more consistent and matched to line speed.

As references above, edible material such as barrier cream solution, when applied with prior art devices, may suffer from drawbacks such as solids being formed due to the cooling of the fat and/or falling out of suspension. Additionally, the prior art systems do not control the heat or movement of the crème which may cause blockages. This may in turn result in a cookie base layer of edible material not being covered.

Conversely, one or more embodiments of the present system minimize contact of the crème to cool temperatures and preferably keep a lesser amount of barrier crème in the hopper. This may allow for better temperature regulation. Additionally, the level of barrier crème in the hopper may be determined and regulated by the hopper level sensor 680 discussed above. Additionally, one or more embodiments may assist in keeping the crème in motion at the opening of the hopper. These advantages may lead to reduced blockages and good coverage of the product.

Additionally, in one or more embodiments, the various parameters of the system may be dialed in to provide the desired weight and coverage at varying line rates. For example, the temperature of the crème, the rate of pump into the hopper, the rate of rotation and heat of the discharge shaping roller, the rate of rotation and temperature of the cooling roller, and the separation of the discharge roller and cooling roller may all be controlled.

Thus, in one or more embodiments, a strip making and applying system may be provided that is not rate dependent, not recipe dependent, requires minimal operator intervention, has less blockages, provides reduced skipping or blank spots on cookie, provides reduced cooling capacity before application and possibly reduced cooling after application, and may be easy to clean.

Other edible materials that may be made into strips include chocolate containing compositions, caramel, nougat, and other creamy liquids to solid components of a confectionary product such as a bar.

Additionally, in one embodiment, the hopper has a heated hopper body. The heated hopper body preferably maintains the barrier crème at a target heat temperature above crystallization. The hopper body also preferably interlocks with and/or houses the licking roll components and/or the silhouettes of the strips. As noted above, the temperature of the hopper body may impact the barrier crème weight and may provide reduced buildup.

Also, the heated licking roll may be attached to, in contact with, abutting, and/or interlocking with the hopper. The heated licking roll may provide the top of the strip or the silhouette opening. Additionally, the heated licking roll may help keep the barrier crème in circulation in the hopper. Further, the rotation per minute of the heated licking roll may be used to vary strip geometry.

As mentioned above, the hopper vibrator may be used to assist in reducing a buildup of the edible material such as barrier crème on the hopper assembly. The hopper vibrator may be controlled to vibrate at a predetermined frequency or to deliver a periodic pulse.

Additionally, the chilled roll may be used to cool the strips of barrier crème after leaving the hopper assembly. The rotation per minute of the chilled roll may be greater or lesser than the rotation per minute of the heated licking roll. Additionally, controlling the rotation of the chilled roll may provide more or less barrier crème to the cookie, or may provide a thicker layer of barrier crème or a more dense and/or less plastic layer of barrier crème.

Also, the scraper blade is preferably heated and peels the strips from the chilled drum or roll and onto the cooking. The strip is preferably plasticized at the point at which it is peeled from the chilled drum. The strip is then turned 180 degrees into the warm cookie top.

Additionally, in one embodiment, the present system may be operated at a rate of 3 m/min. Current practice at line rates of 3.0 m/min or lower may include peristaltic pumps. However, a more desirable process may require less maintenance of the pump heads and hoses.

As mentioned above, one or more embodiments of the present barrier crème applicator may use a "licking roller" to keep the barrier crème moving and not building up inside the hopper and a silhouette where the strip takes its shape on the large cooling wheel. The barrier crème may be cooled to a plastic texture on the cooling drum before it is doctored-off with a heated blade onto continuous strips of hot cookie. The hot cookie preferably melts the barrier crème onto the cookie. The cookie and barrier crème may then be cooled before applying caramel or nougat onto the top.

One or more embodiments of the present system may operate with process parameters that can be varied depending on the nature of the edible material.

TABLE 1

| Process Parameter | Edible Material with 50% fat having a melting point of 40 C. | Edible Material with 50% fat having a melting point of 45 C. | Edible Material with 50% fat having a melting point of 50 C. |
|---|---|---|---|
| Drum Hopper: Jacket Temp | 60 C. | 65 C. | 70 C. |
| Licking Roll: Temperature | 60 C. | 65 C. | 70 C. |
| Cooling Drum Temperature | 15-18 C. | 13-15 C. | 10-13 C. |
| Scraper (Doctor) Blade Temperature | 60 C. | 75 C. | 80 C. |
| Exit Temp of Strip/Release: | 18-22 C. | 18-22 C. | 18-22 C. |

Additionally, one or more embodiments provide a line rate of 2.25 to 3.00 m/min. The system is also easily adjustable to change the amount of barrier crème on top of the cookie. The barrier crème strip is also plasticized on the chilled drum in order to correctly be applied on top of the cookie. The plasticized strip sits on top of the cookie in the correct fashion with no exposed cookie. The cookie, entering into the barrier crème Strip Applicator, is properly aligned to apply barrier crème in the correct manner. The process is simple and scalable to production lines with larger amount of rows. Minimal standard deviation of barrier crème weight between row weights is also provided. The process does not have significant build-up inside the barrier crème hopper, silhouette, and/or scraper (doctor) blade. The rest of the processes, around the barrier crème strip applicator, are able to melt the plasticized strip and solidify the strip on top of the cookie by cooling for increased shelf life. The scraper (doctor) blade is able to operate with minimal delta t between the two sides of the unit. The orientation of the cookie guide rows, located underneath the barrier crème strip applicator, is correctly designed to minimize barrier crème build-up when there is no cookie. The barrier crème strips not being applied to on top of the bar are melted, filtered, and returned to the barrier crème use tank. The process does not generate significant scrap of barrier crème. There are not any large cookie crumbs appearing in the barrier crème strip applicator hopper. The process has a small shear mill before the barrier crème strip applicator to reduce the particle size of the cookie pieces.

While particular elements, embodiments, and applications of the present invention have been shown and described, it is understood that the invention is not limited thereto because modifications may be made by those skilled in the art, particularly in light of the foregoing teaching. It is therefore contemplated by the appended claims to cover such modifications and incorporate those features which come within the spirit and scope of the invention.

The invention claimed is:

1. A system for making a plurality of strips of edible material, said system including:
    a hopper for a flowable edible material, wherein said hopper is heated and includes a base, and said base is divided into several strip-forming regions with each strip forming region including a plurality of discharge openings that are positioned across a width of the hopper, each opening defined by a first side and a second side, the first side and the second side of each opening being separated from each other by a distance representing a desired width of a strip of flowable edible material;
    a discharge shaping roller, wherein said discharge shaping roller is heated and includes a discharge shaping roller surface adjacent to said first side and said second side such that a top surface of the flowable edible material is formed by the discharge shaping roller surface, and wherein said discharge shaping roller is positioned partially within an interior of the hopper and is configured such that said discharge shaping roller contacts the flowable edible material inside the hopper and keeps the flowable edible material in circulation inside the hopper; and
    a cooling roller having a cooling roller surface adjacent to said first side and said second side, wherein the discharge shaping roller and the cooling roller rotate in a same rotational direction while in constant contact with the flowable material, wherein a radial distance between respective rotational centers of the discharge shaping roller and the cooling roller remains equal,
    wherein said discharge shaping roller is separated from said cooling roller by a distance representing a desired height of said strips of flowable edible material, and wherein said flowable edible material simultaneously passes between each of said first sides, each of said second sides, said discharge shaping roller surface, and said cooling roller surface to form a plurality of strips of flowable edible material across a width of the cooling roller; and
    said strips of flowable edible material adhere to said cooling roller surface, and said cooling roller cools said strips of flowable edible material to form cooled plasticized strips of edible material, further including a heated blade separating said cooled strips of edible material from said cooling roller to form separated strips of edible material; and
    said flowable edible material is a suspension; and
    each said separated strip of edible material is deposited such that each separated strip sits on top of a base of edible material.

2. The system of claim 1 wherein the separated strips of edible material comprise barrier crème.

3. The system of claim 1 wherein said base of edible material comprises a cookie.

4. The system of claim 1, wherein said discharge shaping roller is interlocking with the hopper.

5. The system of claim 1, wherein said system has a line rate of from 2.25 m/min to 3.0 m/min.

6. The system of claim 1, further comprising a hopper vibrator.

7. The system of claim 1, wherein said hopper has a fully heated hopper body.

8. The system of claim 1, wherein said hopper is fully heat traced.

9. The system of claim 1, wherein the discharge shaping roller and the cooling roller are configured to rotate in a counter clockwise direction.

10. The system of claim 1, wherein the discharge shaping roller is rotated by a first motor and the cooling roller is rotated by a second motor.

11. The system of claim 1, wherein the discharge shaping roller is configured to move the flowable edible material at a hopper outlet in a first direction and the cooling roller is configured to move flowable edible material at a hopper outlet in a second direction, wherein the first direction and second direction are different.

12. The system of claim 1, wherein said discharge shaping roller circulates the flowable edible material inside the hopper by moving the flowable edible material in the same rotational direction as the discharge roller.

13. A method for making a plurality of strips of edible material, said method including:
providing a hopper for a flowable edible material, wherein said hopper is heated and includes a base, and said base is divided into several strip-forming regions with each strip forming region including a plurality of discharge openings that are positioned across a width of the hopper, each opening defined by a first side and a second side, the first side and the second side of each opening being separated from each other by a distance representing a desired width of a strip of flowable edible material;
providing a discharge shaping roller including a discharge shaping roller surface adjacent to said first side and said second side such that a surface of the flowable edible material is formed by the discharge shaping roller surface, wherein said discharge shaping roller is positioned partially within an interior of the hopper and is configured such that said discharge shaping roller contacts the flowable edible material inside the hopper and keeps the flowable edible material in circulation inside the hopper;
providing a cooling roller having a cooling roller surface adjacent to said first side and said second side wherein said discharge shaping roller is heated and is separated from said cooling roller by a distance representing a desired height of said strips of flowable edible material, wherein the discharge shaping roller and the cooling roller rotate in a same rotational direction while in constant contact with the flowable material, wherein a radial distance between respective rotational centers of the discharge shaping roller and the cooling roller remains equal; and
forming a plurality of strips of flowable edible material across a width of the cooling roller by passing said flowable edible material simultaneously between each of said first sides, each of said second sides, said discharge shaping roller surface, and said cooling roller surface; and
said strips of flowable edible material adhere to said cooling roller surface, and said cooling roller cools said strips of flowable edible material to form cooled plasticized strips of edible material, further including a heated blade separating said cooled strips of edible material from said cooling roller to form separated strips of edible material; and
said flowable edible material is a suspension; and
each said separated strip of edible material is deposited such that each separated strip sits on top of a base of edible material.

14. The method of claim 13, further comprising, after depositing each separated strip of edible material on said base of edible material, melting at least a portion of said separated strip on said base of edible material and subsequently hardening said separated strip on the top of said base of edible material.

15. The method of claim 13, wherein the forming the plurality of strips of the flowable edible material comprises circulating the flowable edible material inside the hopper.

16. The method of claim 15, wherein the circulating comprises moving the flowable edible material in the same rotational direction as the discharge roller.

17. The method of claim 13, wherein the forming the plurality of strips of the flowable edible material comprises rotating the discharge shaping roller using a first motor and rotating the cooling roller by using a second motor.

18. The method of claim 13, wherein the forming the plurality of strips of the flowable edible material comprises moving the flowable edible material at a hopper outlet in a first direction and moving flowable edible material at a hopper outlet in a second direction, wherein the first direction and second direction are different.

19. The method of claim 13, wherein the forming the plurality of strips of the flowable edible material comprises rotating the discharge shaping roller and the cooling roller in a counter clockwise direction.

* * * * *